United States Patent Office 3,323,680
Patented June 6, 1967

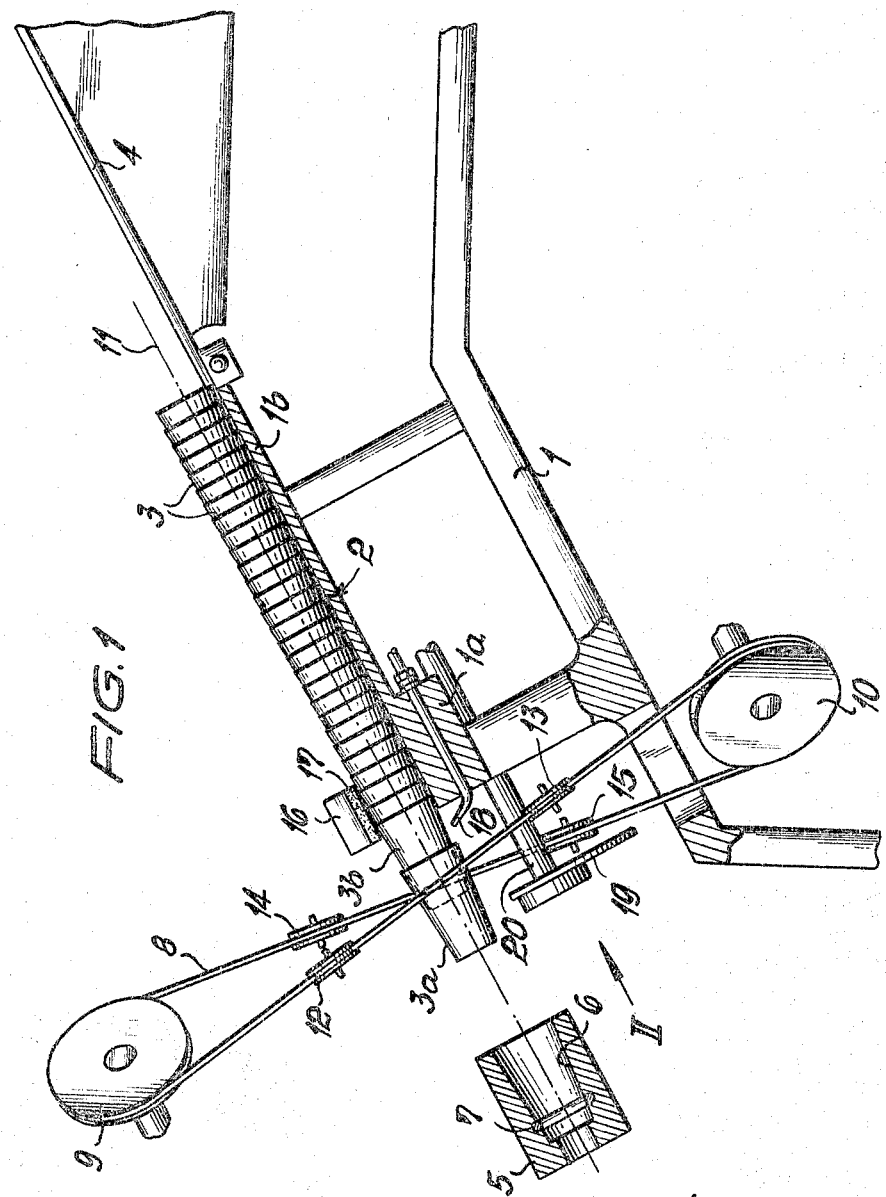

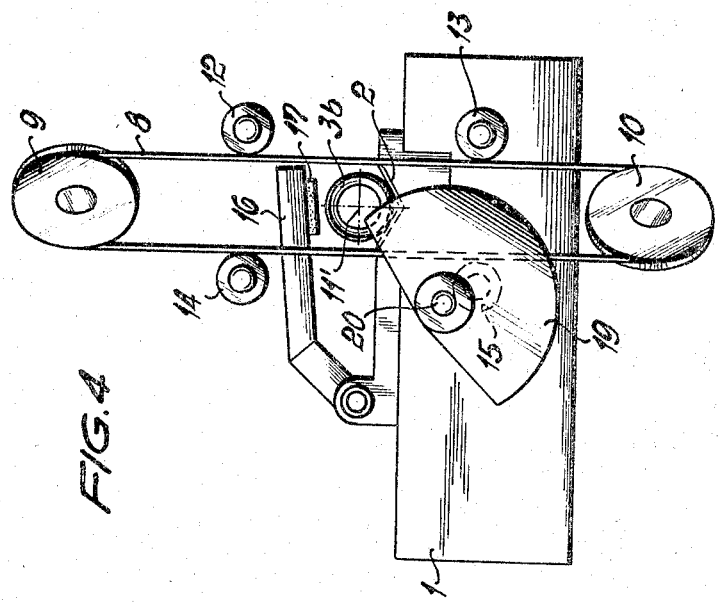
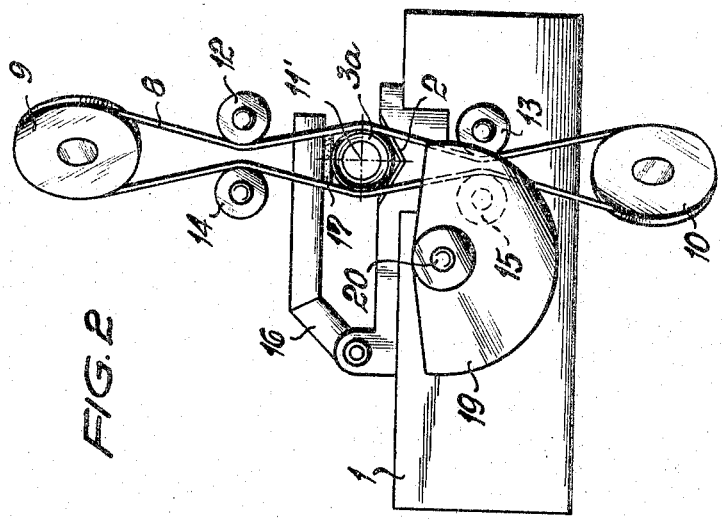

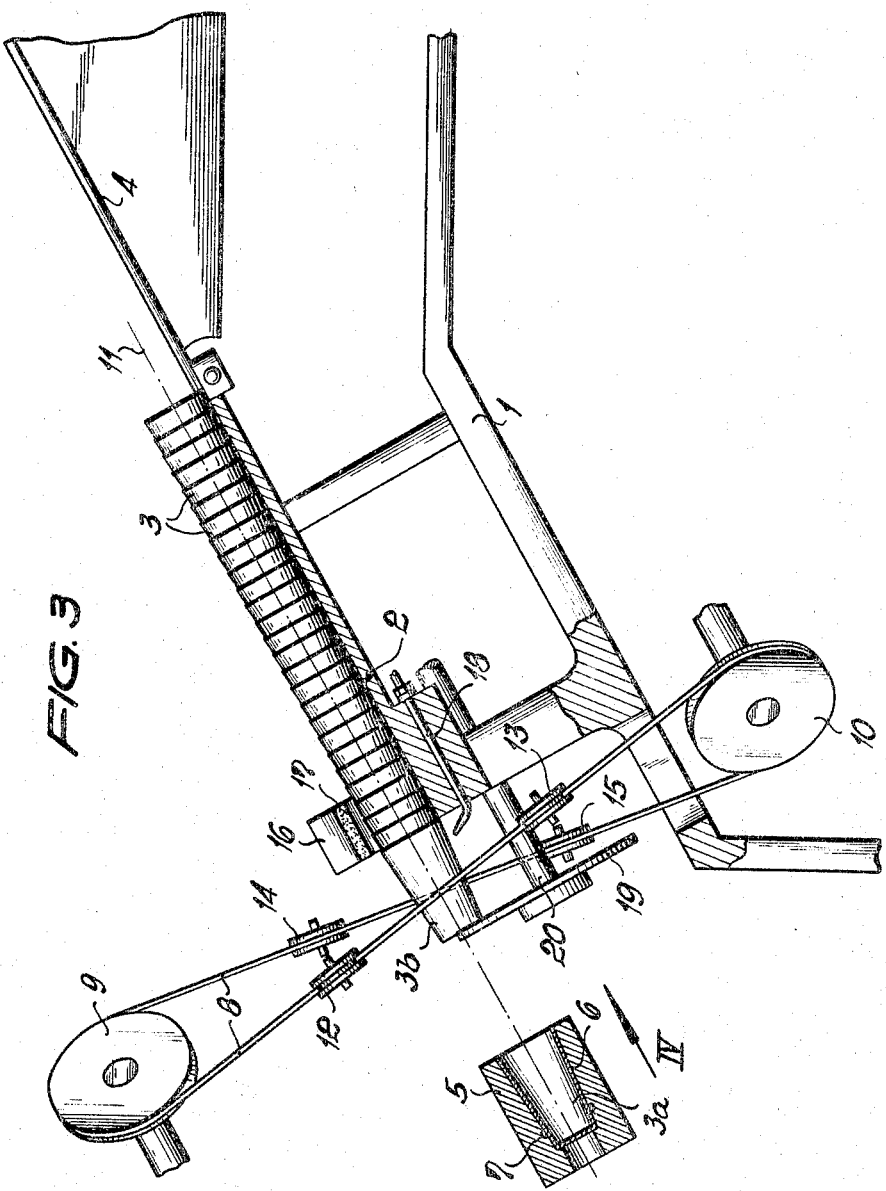

3,323,680
ARTICLE DISPENSER WITH SIMULTANEOUSLY
ACTING, CIRCUMPOSED DISCHARGE MEANS
Wilhelm Beer, Flachstrasse 4, Wiesbaden-
Dotzheim, Germany
Filed Oct. 5, 1965, Ser. No. 493,000
7 Claims. (Cl. 221—221)

This invention relates, in general, to article separating devices and, in particular, to a new and useful device for separating a series of interengaged thin-walled hollow conical elements by a twisting and spirally advancing motion and to a method of separating hollow frusto-conical articles from an interengaged stack.

The present invention is particularly applicable for the separation of thin-walled hollow conical bodies which are interengaged or stacked in a pole-like fashion for the purpose of transportation and storage. Such an apparatus is particularly useful in connection with the separation of a series of bottle caps, which usually consist of a lead-tin alloy or aluminum foil and are very thin-walled. In the known devices, separation of such elements from a series or a roll is effected by air pressure only. This requires either the use of special capsule shapes, for example, capsules provided with circumferential grooves or a flange, in order to provide a working surface for the pressure air, or the use of capsules with perforated bottoms for providing a working surface for the mechanical detachment, such as by use of a grab-hook. The equipment required for such devices very often makes them undesirable. In addition, some of them are not satisfactory for separating very thin-walled conical elements, because of the cylindrical shape and because of the fact that they cannot hold them securely. Devices of this nature have a tendency to jam a capsule as a result of a buckling of a whole stack or pole. As a result, they cannot be employed in fully automatic bottling machines and the elements must be singled out or separated by hand.

In accordance with the present invention, there is provided a separating or singling device which includes means for permitting the feeding of a series or a stack of thin-walled conical elements to a predetermined location, which is advantageously set by a stop. The means are provided for engaging the stack behind the first element to be separated, and means are provided for moving the element off the stack by a twisting and spirally advancing motion.

The present invention contemplates many types of devices for separating the foremost element from the interengaged series, but generally the invention provides means for engaging the side walls of the foremost element and twisting and advancing the element away from the stack. In a preferred arrangement, an elastic belt, for example, of a rubber material, may be employed, which is guided by guide pulleys to enforce engagement of the belt on each side of the element to be separated. In order to move the belt, at least one of the guide pulleys for the belt is driven and each belt reach is advanced through a course so that they diagonally intersect the respective center line of the element to be separated.

Instead of one belt, it has been found feasible to use two endless belts which may engage the element to be separated from opposite sides. The construction, in such instance, is advantageously such that either or both of the belts may be guided toward the center line of the element to be separated and both may be displaced laterally for effecting the movement away from the stack. The same or a similar effect may be achieved by two pushing elements, each of which has roller elements which engage on opposite sides of a continuous band which is trained to run on the opposite faces of the element to be separated. The pusher elements may be simultaneously or independently moved or advanced toward the elastic endless band to cause greater or lesser engagement with the element being separated.

A still further embodiment advantageously comprises gripping elements or resiliently engageable elements which are advanced in a twisting motion against the side walls of each element to be separated to advance it away from the stack.

A feature of the invention is that the separation of the foremost hollow body from the pole or stack is effected mechanically and by a constrained guide motion. As a result, it is possible to insure a safe separation even if the foremost hollow body is seriously jammed in the pole. The mechanical means used can be used in connection with any given shape of hollow body. In the case of stacked capsules for bottle caps, no grooving of the capsule surface or flanging of the capsule and/or perforation of the capsule is required. The device advantageously employs air pressure for supporting the hollow body as it is being separated from the pole or stack and transported to the place for receiving the individual element so separated.

Accordingly, it is an object of the invention to provide a device for separating interengaged stacked elements, which includes means for mechanically engaging the side walls of the leading element and rotating and advancing the engaged element away from the stack.

A further object of the invention is to provide means for automatically separating a series of interengaged elements, particularly thin-walled conical elements, which are stacked in a pole-like fashion, which includes means for advancing the elements to a stop and for thereafter clamping the stack of such elements behind the first one, moving the stop out of a blocking position and thereafter engaging the side walls of a further foremost or first element and twisting and moving it or the stack.

A further object of the invention is to provide a method of disassociating a thin-walled, substantially conical element from a stack thereof, which comprises feeding the stack toward a stop member, clamping the stack behind the foremost element and thereafter engaging the side walls of the foremost element and twisting it and moving it away from the clamped stack.

A further object of the invention is to provide a device for separating stacked elements which includes means for engaging the side walls thereof, which advantageously comprise a resilient element which is directed into interengagement therewith on both sides of the element.

A further object of the invention is to provide a device for separating each element of a plurality of stacked elements which is simple in design, construction and manufacture.

The various features of novelty which characterize the invention are pointed out with particularity in the claims annexed to and forming a part of this specification. For a better understanding of the invention, its operating advantages and specific objects attained by its use, reference should be had to the accompanying drawings and descriptive matter in which there are illustrated and described preferred embodiments of the invention.

In the drawings:

FIG. 1 is a partial side elevational and partial sectional view of a device for separating thin-walled conical elements from a stack thereof constructed in accordance with the invention, the mechanical separating elements having guide pulleys being shown in an offset manner in order to indicate the operation thereof;

FIG. 2 is a front elevational view of the separating device indicated in FIG. 1;

FIG. 3 is a view similar to FIG. 1, indicating the initial position of the stack as it is fed against a stop member;

FIG. 4 is a front elevational view with approximately the arrangement shown in FIG. 3;

FIG. 5 is a front elevational view of another embodiment of the mechanism for operating upon the foremost element of a stack;

FIG. 8b is a section taken on the line 8b—8b of FIG. 8a;

Figure 5A:
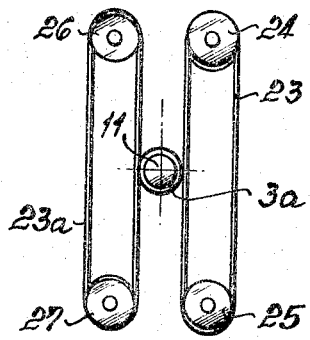
FIG. 5a is a front elevational view of another embodiment of the said engaging mechanism.

Referring to the drawings in particular, the invention embodied in FIGS. 1–4 comprises a bottle insert separating device which includes a main frame 1 having a supporting portion 1a with a V-shaped grooved receiving portion 2 thereon for receiving the foremost end of a stack 3 of interengaged thin-walled conical members which form inserts for bottle sealing. The frame also provides a guideway or track 1b which receives a stack 3 from a magazine or other supply 4.

As indicated in FIG. 1, in accordance with the invention, means are provided for automatically clamping the stack 3 at the location of a second element 3b, leaving the foremost or first element 3a available for removal from the stack 3. As indicated in the drawings, the clamping means advantageously include a pivotal clamping bar member 16 having a resilient clamping face 17 which engages the stack 3 without damaging the walls thereof.

In order to precisely orient the stack for proper engagement thereof by the clamping means 16 and 17, there is provided a rotatable stop member 19 which comprises a segment plate which is affixed to a shaft 20 and which is rotated during the cycle to a position at which the arcuate portion projects upwardly to block the feeding of the stack 3 as indicated in FIG. 3. In this position, the second element 3b is then lying below the clamping means 16 and 17 and the foremost element 3b is located directly ahead of the clamping means.

In accordance with a feature of the invention, means are provided to mechanically engage the side walls of the foremost element 3a and to impart a twisting or turning movement and advancing movement to the walls in order to free it from the associated stack 3 and move it away from the stack. In the embodiment indicated in FIGS. 1–4, such means comprise spaced rollers 9 and 10 over which is directed an endless resilient member or band 8. The endless resilient member 8, which may advantageously be an elastic round cord such as of a rubber material or other preferably elastic material, is automatically operated to engage the side walls of the foremost element 3a after clamping of the stack 3 has been accomplished. The means for effecting the engagement of the side walls of the element 3a with the resilient element 8 in the embodiment of FIGS. 1–4 comprise displaceable guide rollers 12 and 14 and 13 and 15 which are arranged on alternate sides above and below the endless element 8. As indicated in FIGS. 1 and 2, when the roller elements 12 and 13 are moved toward the roller elements 14 and 15, they cause the endless cord 8 to engage around the periphery of the walls of the thin-walled element 3a. As indicated in the drawings, the engagement cords 8 are advantageously trained so that they will be moved by rotation of one of the pulleys 9 or 10 in a manner such as they will normally engage the element 3a at the intersection of a vertical center line 11 of a stack 3 (FIGS. 1 and 3) and the pulleys are oriented so that their center line corresponds with the center line 11' of the foremost element 3a (FIGS. 2 and 4).

FIG. 2 shows the position of the pressing rollers 12 to 15 when the cord 8 lies against the foremost bottle cap 3a.

FIG. 4 shows the position when the cord 8 passes the bottle cap and allows the pole stack 3 to advance downwardly to cause the next element 3b to engage the stop 15 which has been rotated upwardly.

As the foremost element 3a is being twisted off the stack 3, it is advanced toward a receiving jacket 5 which has a similarly shaped frusto-conical recess or bore 6 having a projecting O-ring 7 which effects engagement of the element 3a when it is directed therein. The advancing means in the embodiment illustrated advantageously comprise a blowing member 9 which is arranged to direct air against the foremost element at it is being freed and to convey it to the receiving jacket 5.

Figure 5B:
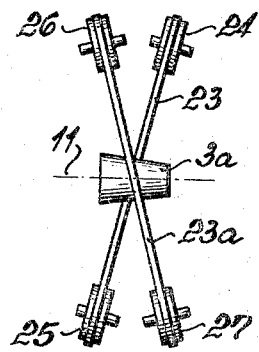
FIG. 5b is a side elevational view of the mechanism indicated in FIG. 5a, with the guiding rollers for the separating mechanism indicated offset to show the intersection of the elastic element with the element to be removed from the stack.

In the embodiment illustrated in FIGS. 5a and 5b, the mechanical means for separating a foremost element 3a from the stack 3 comprise endless elastic cord elements 23 and 23a which are trained around spaced guide rollers 24 and 25 and 26 and 27, respectively. At least one of the pulleys 24 to 27 is driven in such a manner that the cords 23 and 23a are moved and pressed simultaneously from opposite sides against the foremost bottle cap 3a.

Figure 6A:
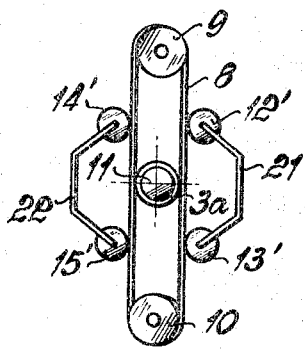
FIG. 6a is a view similar to FIG. 5a of another embodiment of the invention.
Figure 6B:
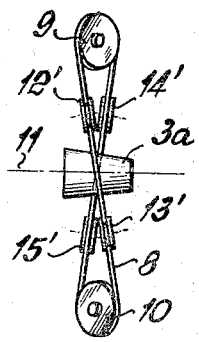
FIG. 6b is a view similar to FIG. 5b of another embodiment of the invention.

In FIGS. 6a and 6b, the arrangement of FIG. 1 is shown in respect to the endless resilient element 8, but in this embodiment rollers 12' and 13' are carried on a single carrier 21 and the rollers 14' and 15' are carried on an opposite carrier 22. One or both of the carriers are arranged so that they will be moved toward or away from the resilient member 8 in order to engage like tongs thereon and to bring the resilient element into engagement or disengagement with the foremost element 3a.

Figure 7A:
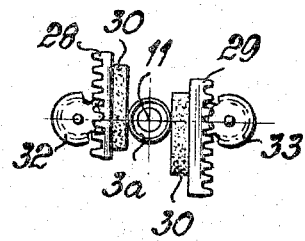
FIG. 7a is a view similar to FIG. 5a of still another embodiment of the invention.
Figure 7B:
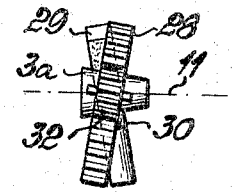
FIG. 7b is a view similar to FIG. 5b of still another embodiment of the invention.

In the embodiment of FIGS. 7a and 7b, there are provided pusher elements 28 and 29 arranged on respective opposite sides of the foremost element 3a, and each includes a resilient padding or engageable portion 30 which bears against the foremost element with a twisting motion upon rotation of driving gears 32 and 33 which are respectively engaged with rack elements to find on the pushers 28 and 29, respectively.

Figure 8A:
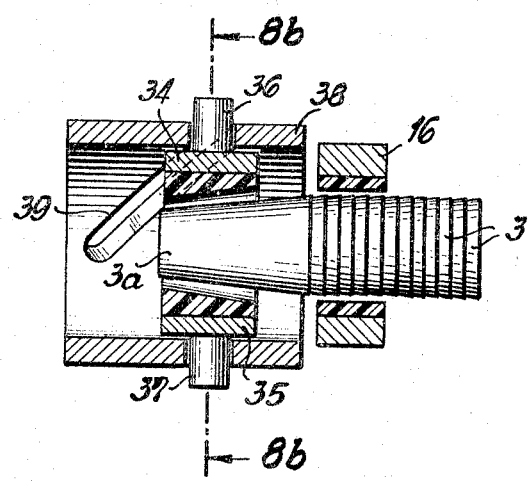
FIG. 8a is a longitudinal sectional view of still another embodiment of the mechanism for separating the foremost element from the stack.
Figure 8B:
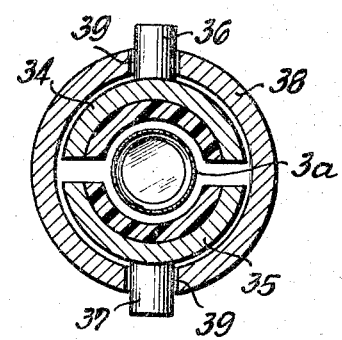

In the embodiment indicated in FIGS. 8a and 8b, there are provided two chucks or clamping dogs 34 and 35 having elastic linings which bear against the foremost capsule 3a and which together extend substantially 360° of the circumference of the engaged article or capsule to be separated. Each of the two clamping dogs 34 and 35 carries a cylindrical pivot (36, 37 respectively) which is guided in a helical-shaped groove 39 of a fixed bushing guide 38.

Figure 8C:
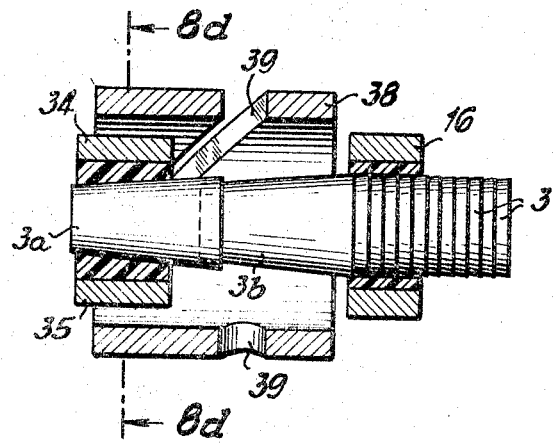
FIG. 8c is a view similar to FIG. 8a, but indicating the device in an advanced position.
Figure 8D:
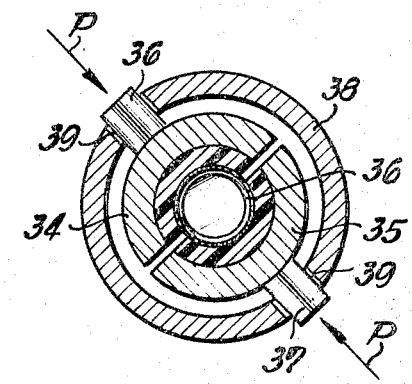
FIG. 8d is a section taken on the line 8d—8d of FIG. 8c.

The device indicated in FIGS. 8a and 8b works as follows: In the position shown in FIGS. 8a and 8b, when the clamping dogs 34 and 35 are opened, the brake element 16 indicated in the embodiment of FIGS. 1 to 4 would be in an open position. The pole stack 3 is in advance to the stop and the second most element in the series is engaged as in the previous embodiment. Thereafter the stop is removed out of the way and the two clamping dogs 34 and 35 are ready to be displaced inwardly in order to embrace the capsule 3a. This displacement is effected, for example, by radially inwardly directed forces which act on the pivots 36 and 37 and they may be effected by mechanical or hydraulic or pneumatic means (not shown). Thereafter the two clamping dogs 34 and 35 are displaced by suitable means (not shown) from the right to the left in the direction of the view indicated in FIGS. 8a and 8c, whereby a helicoidal movement is imparted to them in the groove 39 and the foremost bottle cap 3a is separated from the stack 3 and moved forwardly therewith. As soon as the clamping dogs 34 and 35 have reached the foremost position they are released and, in turn, release the bottle cap 3a for further advance to the receiving place. They are then automatically moved backwardly to the basic position in accordance with FIGS. 8a and 8b and are ready for receiving the next capsule.

While specific embodiments of the invention have been shown and described in detail to illustrate the application of the inventive principles, it will be understood that the invention may be embodied otherwise without departing from such principles.

What is claimed is:

1. A device for separating hollow articles such as frustoconical bottle inserts from a stacked series of articles comprising means for supporting a stacked series of articles having one end oriented downwardly and with the individual articles in an orientation in which they are urged downwardly under the influence of gravity, a movable stop member movable periodically into and out of alignment with said series of articles and supporting said series when aligned therewith, means for periodically clamping said series with the exception of the lowermost article thereof just before said movable stop is moved out of alignment therewith, and means for disengaging and advancing the lowermost article away from said series including a member engageable across opposite sides of the lowermost article along contact lines extending obliquely and in oppositely inclined directions on the respective opposite sides of the lowermost article and contacting the article with a turning and advancing movement in a direction away from the series.

2. A device according to claim 1, wherein said means for disengaging and advancing the lowermost article is an elastic endless band trained around the foremost article, and means for moving said elastic band into engagement with the sides of the foremost article to rotate said article while the stack is clamped in order to separate it from the stack.

3. A device according to claim 1 including air means for aiding in conveying the article away from the stack.

4. A device according to claim 1 wherein the means for disengaging and advancing the lowermost article includes a movable endless resilient band member trained around opposite sides of said article, and roller means for moving said endless band member into frictional engagement with the exterior of the foremost article on opposite sides thereof to twist it and move it away from said series by movement of said band, and a receiving jacket spaced from the end of the foremost article.

5. A device according to claim 1, including a receiving jacket for the lowermost article, said receiving jacket having means for engaging the lowermost article therein.

6. A device according to claim 1 wherein said means for disengaging and advancing the lowermost article away from the series comprises an endless belt trained around said article with portions thereof on each side of said article and disposed in separate planes which cross at said lowermost article, and carrier means enagageable with each side of said belt for directing said belt into engagement with the sides of said article.

7. A device according to claim 1, wherein said stop comprises a circular disc stop, said disc stop being rotatable, after said clamping means is effective to clamp said stack, out of the path of said articles to permit displacement of the foremost article away from the stack.

References Cited

UNITED STATES PATENTS

| 1,609,581 | 12/1926 | Smith | 221—221 X |
| 2,734,657 | 2/1956 | Drese | 221—278 X |
| 3,083,868 | 4/1963 | Mueller | 221—221 X |
| 3,099,120 | 7/1963 | Bruun | 221—278 X |

SAMUEL F. COLEMAN, *Primary Examiner.*